United States Patent
Furuta

(10) Patent No.: US 12,083,846 B2
(45) Date of Patent: Sep. 10, 2024

(54) VEHICLE SUSPENSION CONTROL DEVICE AND VEHICLE SUSPENSION CONTROL METHOD

(71) Applicant: TOYOTA JIDOSHA KABUSHIKI KAISHA, Toyota (JP)

(72) Inventor: Hiroki Furuta, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 244 days.

(21) Appl. No.: 17/890,720

(22) Filed: Aug. 18, 2022

(65) Prior Publication Data

US 2023/0125985 A1    Apr. 27, 2023

(30) Foreign Application Priority Data

Oct. 22, 2021   (JP) ................................ 2021-172937

(51) Int. Cl.
*B60G 17/0165*   (2006.01)
*B60G 17/018*    (2006.01)

(52) U.S. Cl.
CPC ....... *B60G 17/0165* (2013.01); *B60G 17/018* (2013.01); *B60G 2400/102* (2013.01); *B60G 2400/252* (2013.01); *B60G 2400/91* (2013.01); *B60G 2500/10* (2013.01); *B60G 2600/17* (2013.01); *B60G 2600/602* (2013.01); *B60G 2600/604* (2013.01)

(58) Field of Classification Search
CPC .............. B60G 17/0165; B60G 17/018; B60G 2400/102; B60G 2400/252; B60G 2400/91; B60G 2500/10; B60G 2600/17; B60G 2600/602; B60G 2600/604; B60G 17/0195; B60G 17/08; B60G 2400/204; B60G 2400/821; B60G 2800/162; B60G 17/06
USPC ........................................................... 701/37
See application file for complete search history.

(56) References Cited

U.S. PATENT DOCUMENTS 5,740,039 A * 4/1998 Hirahara .............. B60G 17/018
                                                       701/37
2005/0178628 A1* 8/2005 Uchino ................ B60G 17/016
                                                       188/379

(Continued)

FOREIGN PATENT DOCUMENTS

| JP | H08-127213 A | 5/1996 |
| JP | 2019-135120 A | 8/2019 |
| JP | 2020-059477 A | 4/2020 |

*Primary Examiner* — Scott A Reinbold
(74) *Attorney, Agent, or Firm* — Dinsmore & Shohl LLP

(57) ABSTRACT

A vehicle suspension control device includes: an actuator configured to apply a control force in a vertical direction between an unsprung structure and a sprung structure; and an electronic control unit configured to control the actuator so as to generate the control force according to a required control amount for reducing vibration of the sprung structure. The required control amount includes at least two control terms of a displacement term, a velocity term, and an acceleration term related to displacement, velocity, and acceleration of the sprung structure. The electronic control unit calculates a magnitude of a frequency component of each of a plurality of frequency bands included in road surface vibration information, and determines a control gain of each of the at least two control terms so as to change based on the magnitude of the frequency component of each of the plurality of frequency bands.

7 Claims, 5 Drawing Sheets

(56) References Cited

U.S. PATENT DOCUMENTS

| | | | |
|---|---|---|---|
| 2018/0154723 A1* | 6/2018 | Anderson | H02K 11/33 |
| 2019/0241038 A1* | 8/2019 | Katsuyama | B60G 17/01908 |
| 2019/0283520 A1* | 9/2019 | Furuta | B60G 17/06 |
| 2020/0114721 A1* | 4/2020 | Tanzan | B60G 17/0157 |

* cited by examiner

VEHICLE SUSPENSION CONTROL DEVICE AND VEHICLE SUSPENSION CONTROL METHOD

CROSS-REFERENCE TO RELATED APPLICATION

The present disclosure claims priority under 35 U.S.C. § 119 to Japanese Patent Application No. 2021-172937, filed on Oct. 22, 2021, which is incorporated herein by reference in its entirety.

BACKGROUND

Technical Field

The present disclosure relates to a vehicle suspension control device including an actuator configured to apply a control force in a vertical direction between an unsprung structure and a sprung structure of a vehicle, and a vehicle suspension control method.

Background Art

JP H08-127213 A discloses a suspension control device. This suspension control device includes an actuator configured to generate a control force that can control a vertical stroke between a wheel and a vehicle body, and controls the actuator so as to cancel a vibration input transmitted from an unsprung structure to the vehicle body via a suspension. Also, the suspension control device reduces a control gain when the input of an unsprung resonance frequency component increases.

SUMMARY

In the technique described in JP H08-127213 A, when the magnitude (level) of a frequency component of a specific frequency band is large, the control gain is decreased in order to reduce a decrease in the vibration damping effect caused by execution of the suspension control.

In order to reduce the vibration of the sprung structure, a required control amount having at least two control terms of a displacement term, a velocity term, and an acceleration term related to the displacement, velocity, and acceleration of the sprung structure may be used. However, with the technique described in JP H08-127213 A (that is, the technique of simply reducing the control gain), it is not possible to appropriately adjust the balance of the control gains between the at least two control terms. Therefore, it is difficult to perform damping by effectively utilizing each control term.

The present disclosure has been made in view of the problem described above, and an object of the present disclosure is to effectively perform vibration damping of a sprung structure while using a required control amount having at least two control terms described above.

A vehicle suspension control device according to the present disclosure includes an actuator and an electronic control unit. The actuator is configured to apply a control force in a vertical direction between an unsprung structure and a sprung structure of a vehicle. The electronic control unit is configured to control the actuator so as to generate the control force according to a required control amount for reducing vibration of the sprung structure. The required control amount includes at least two control terms of a displacement term, a velocity term, and an acceleration term related to displacement, velocity, and acceleration of the sprung structure. The electronic control unit is configured to execute a calculation process and a gain determination process. The calculation process is a process of calculating a magnitude of a frequency component of each of a plurality of frequency bands included in road surface vibration information related to road surface input to the vehicle or the vibration of the sprung structure due to the road surface input. The gain determination process is a process of determining a control gain of each of the at least two control terms so as to change based on the magnitude of the frequency component of each of the plurality of frequency bands.

A frequency band having a largest frequency component among the plurality of frequency bands is referred to as a specific frequency band. In the gain determination process, the electronic control unit may be configured to: increase one or more control gains of one or more control terms having a vibration damping effect of reducing the vibration of the sprung structure in the specific frequency band among the at least two control terms; and decrease one or more control gains of one or more control terms having a vibration excitation effect of promoting the vibration of the sprung structure in the specific frequency band among the at least two control terms.

The at least two control terms may include the displacement term. Strength of a high-pass filter applied to a sprung state quantity included in the displacement term may be higher than strength of a high-pass filter applied to one or more sprung state quantities included in a remaining one or two control terms.

The at least two control terms may include the acceleration term. Strength of a low-pass filter applied to a sprung state quantity included in the acceleration term may be higher than strength of a low-pass filter applied to one or more sprung state quantities included in a remaining one or two control terms.

The plurality of frequency bands may include, for each of the at least two control terms, a frequency band having a vibration damping effect of the sprung structure.

The plurality of frequency bands may include, for each of the at least two control terms, a frequency band having a vibration excitation effect of the sprung structure.

A vehicle suspension control method according to the present disclosure is a method of controlling an actuator, which is configured to apply a control force in a vertical direction between an unsprung structure and a sprung structure of a vehicle, so as to generate the control force according to a required control amount for reducing vibration of the sprung structure. The required control amount includes at least two control terms of a displacement term, a velocity term, and an acceleration term related to displacement, velocity, and acceleration of the sprung structure. The vehicle suspension control method includes: calculating a magnitude of a frequency component of each of a plurality of frequency bands included in road surface vibration information related to road surface input to the vehicle or the vibration of the sprung structure due to the road surface input; and determining a control gain of each of the at least two control terms so as to change based on the magnitude of the frequency component of each of the plurality of frequency bands.

According to each of the vehicle suspension control device and the vehicle suspension control method of the present disclosure, the balance between the control gains of at least two control terms of the required control amount for reducing the vibration of the sprung structure is determined so as to change based on the magnitude of the frequency component of each of the plurality of frequency bands included in the road surface vibration information. As a result, it is possible to effectively perform vibration damping of the sprung structure in accordance with the road surface vibration information.

DETAILED DESCRIPTION

In the following, embodiments of the present disclosure will be described with reference to the accompanying drawings. However, it is to be understood that even when the number, quantity, amount, range or other numerical attribute of an element is mentioned in the following description of the embodiments, the present disclosure is not limited to the mentioned numerical attribute unless explicitly described otherwise, or unless the present disclosure is explicitly specified by the numerical attribute theoretically.

1. Configuration of Vehicle

Figure 1:
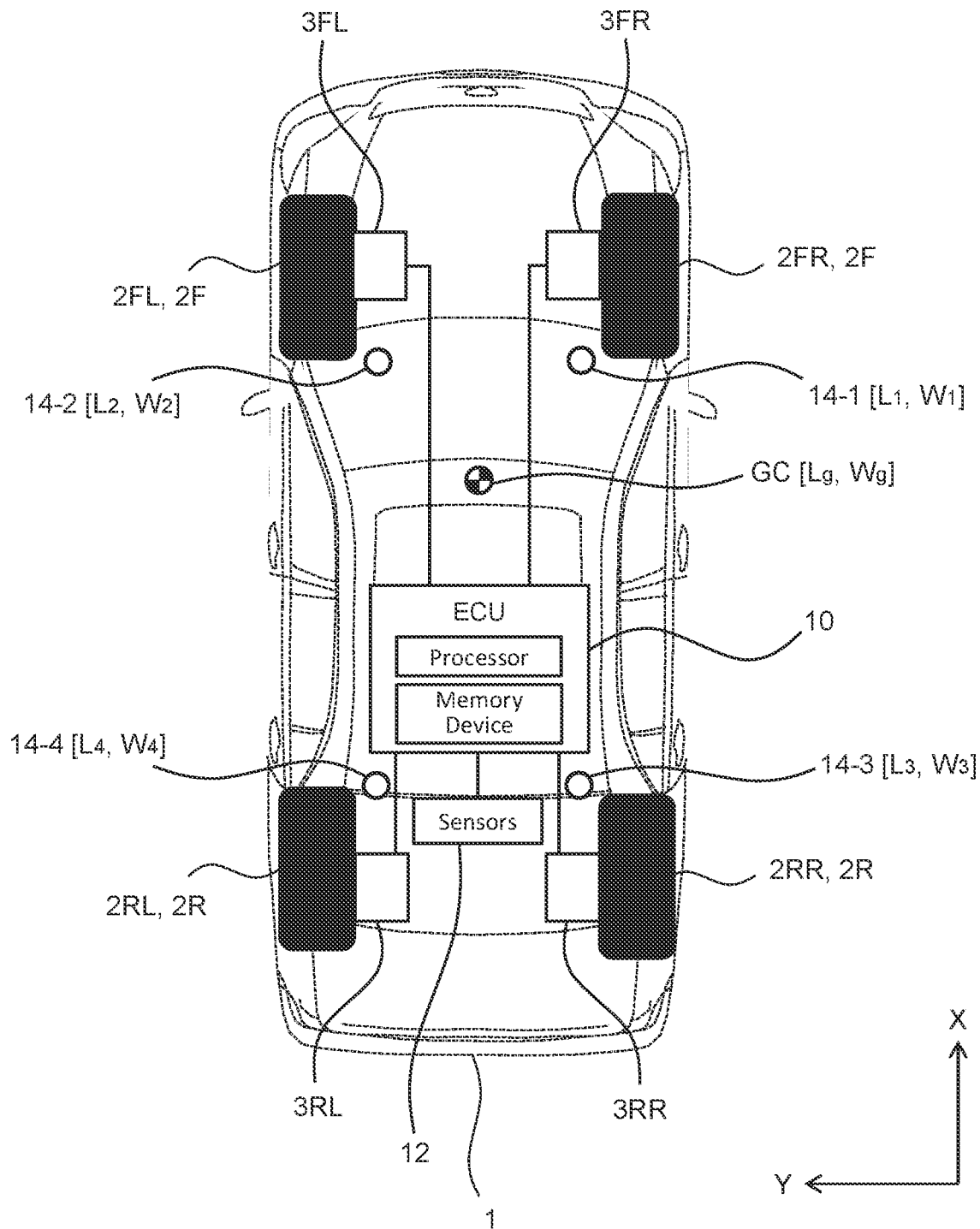
FIG. 1 is a diagram schematically showing an example of the configuration of a vehicle according to an embodiment.

FIG. 1 is a diagram schematically showing an example of the configuration of a vehicle 1 according to an embodiment. The vehicle 1 is provided with wheels 2, and suspensions 3 that suspend the wheels 2 from a vehicle body 6 (see FIG. 2). The wheels 2 include a left front wheel 2FL, a right front wheel 2FR, a left rear wheel 2RL, and a right rear wheel 2RR. Suspensions 3FL, 3FR, 3RL, and 3RR are provided for the left front wheel 2FL, the right front wheel 2FR, the left rear wheel 2RL, and the right rear wheel 2RR, respectively. In the following description, each wheel is referred to as a wheel 2 and each suspension is referred to as a suspension 3, if there is no particular need to distinguish from each other.

Figure 2:
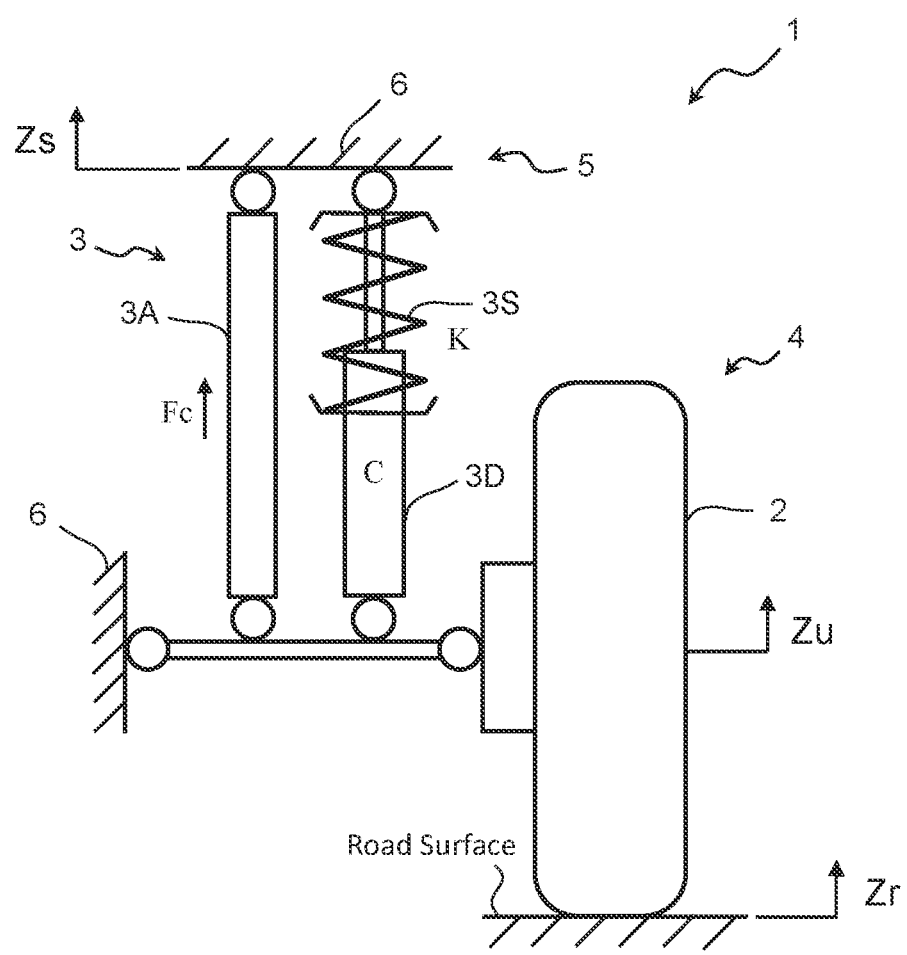
FIG. 2 is a diagram schematically showing an example of the configuration of a suspension according to the embodiment.

FIG. 2 is a diagram schematically showing an example of the configuration of the suspension 3 according to the embodiment. The suspension 3 is provided so as to connect an unsprung structure 4 and a sprung structure 5 of the vehicle 1. The unsprung structure 4 includes the wheel 2. The sprung structure 5 includes the vehicle body 6. The suspension 3 includes a spring 3S, a damper (shock absorber) 3D, and an actuator 3A. The spring 3S, the damper 3D, and the actuator 3A are provided in parallel between the unsprung structure 4 and the sprung structure 5. A spring constant of the spring 3S is K. A damping coefficient of the damper 3D is C. The actuator 3A applies a control force Fc in the vertical direction between the unsprung structure 4 and the sprung structure 5. As a result, the stroke of the suspension 3 is controlled.

More specifically, the actuator 3A is an electric or hydraulic active actuator (i.e., an actuator applied to so-called full-active suspension) as an example. However, the "actuator" according to the present disclosure is not particularly limited as long as the control force Fc in the vertical direction can be applied between the unsprung structure 4 and the sprung structure 5. For example, the actuator may be an actuator that makes the damping force generated by the damper 3D variable, or may be an actuator of an active stabilizer device. Moreover, for example, in a vehicle equipped with a suspension configured to be able to convert a vehicle longitudinal force (i.e., driving force and braking force) acting on a wheel into the control force Fc by using suspension geometry, the actuator may be an actuator (for example, an electric motor) configured to generate the vehicle longitudinal force. The electric motor may be, for example, an in-wheel motor (IWM) provided in a wheel, or may be an electric motor configured to drive a wheel via a vehicle drive shaft.

Furthermore, the vehicle 1 includes an electronic control unit (ECU) 10. The ECU 10 is equipped with a processor, a memory device, and an input/output interface. The input/output interface receives sensor signals from sensors 12 attached to the vehicle 1, and outputs operation signals to the actuator 3A. Various control programs for controlling the actuator 3A is stored in the memory device. The processor reads a control program from the memory device and executes the control program. As a result, the suspension control using the actuator 3A is achieved. The vehicle 1 may include a plurality of ECUs 10.

The sensors 12 include, for example, a sprung acceleration sensor configured to detect the vertical acceleration of the sprung structure 5. In the example shown in FIG. 1, four sprung acceleration sensors 14-$i$ ($i$=1 to 4) are provided. More specifically, the sprung acceleration sensor 14-1 detects a sprung acceleration at a first position closer to the right front wheel 2FR when viewed from the sprung gravity center position (i.e., a gravity center position GC of the sprung structure 5). The sprung acceleration sensor 14-2 detects a sprung acceleration at a second position closer to the left front wheel 2FL when viewed from the sprung gravity center position GC. The sprung acceleration sensor 14-3 detects a sprung acceleration at a third position closer to the right rear wheel 2RR when viewed from the sprung gravity center position GC. The sprung acceleration sensor 14-4 detects a sprung acceleration at a fourth position closer to the left rear wheel 2RL when viewed from the sprung gravity center position GC. That is, the numerical values 1 to 4 of the symbol "$i$" correspond to the right front wheel 2FR, the left front wheel 2FL, the right rear wheel 2RR, and the left rear wheel 2RL, respectively. It should be noted that the distance from the sprung gravity center position GC to each of the first to fourth positions can be freely determined. Also, the sensors 12 include, for example, a lateral acceleration sensor, a suspension stroke sensor, an unsprung acceleration sensor, and a wheel speed sensor provided for each wheel 2.

2. Suspension Control

The suspension control executed by the ECU 10 includes feedback control based on the skyhook control law for reducing vibration of the sprung structure 5 (hereinafter, referred to as "FB control of the sprung state quantities" or simply as "FB control"). It should be noted that this FB control is executed for each of the four wheels 2 as an example, but instead of this, for example, may be executed for only the left and right front wheels 2F or only the left and right rear wheels 2R.

2-1. Basic Configuration Example of FB Control of Sprung State Quantities

In this FB control, the ECU 10 controls the actuator 3A so as to generate the control force Fc according to a required control amount X for reducing the vibration of the sprung structure 5. In an example described below, the ECU 10 calculates, as the required control amount X, a vertical required control amount Fz, a roll required control amount Mr, and a pitch required control amount Mp that are required control amounts for reducing the respective mode vibrations (i.e., vertical vibration (heave vibration), roll vibration, and pitch vibration) of the sprung gravity center position GC.

The detection value of the sprung acceleration detected by each sprung acceleration sensor 14-$i$ ($i$=1 to 4) is hereinafter referred to as "detected acceleration $Z_i''$". The ECU 10 calculates mode accelerations (that is, vertical acceleration $Z_g''$, roll acceleration $\Phi_g''$, and pitch acceleration $\Theta_g''$) at the sprung gravity center position GC from the detected accelerations $Z_1''$ to $Z_4''$ respectively detected by the four sprung acceleration sensors 14-1 to 14-4. For example, the ECU 10 calculates the vertical acceleration $Z_g''$, the roll acceleration $\Phi_g''$, and the pitch accelerations $\Theta_g''$ in accordance with the following Equations (1) to (4). It should be noted that the positions of each of the sprung acceleration sensors 14-$i$ ($i$=1 to 4) in an X direction (i.e., the traveling direction of the vehicle 1) and a Y direction (i.e., the lateral direction of the vehicle 1) are Li and Wi, respectively (see FIG. 1). The X-direction position and the Y-direction position of the sprung gravity center position GC are Lg and Wg, respectively. These parameters (Li, Wi, Lg, and Wg) are acquired in advance and stored in the memory device of the ECU 10.

$$M = \begin{bmatrix} L_1W_1 & L_1 & W_1 & 1 \\ L_2W_2 & L_2 & W_2 & 1 \\ L_3W_3 & L_3 & W_3 & 1 \\ L_4W_4 & L_4 & W_4 & 1 \end{bmatrix}^{-1} \quad (1)$$

$$Z_g'' = \sum_{i=1}^{4} \{M(2,i)L_g + M(4,i)\}Z_i'' \quad (2)$$

$$\Phi_g'' = -\sum_{i=1}^{4} \{M(1,i)L_g + M(3,i)\}Z_i'' \quad (3)$$

$$\Theta_g'' = \sum_{i=1}^{4} M(2,i)Z_i'' \quad (4)$$

By using the detected accelerations $Z_1''$ to $Z_4''$ at the four positions, it is possible to accurately calculate the vertical acceleration $Z_g''$, the roll acceleration $\Phi_g''$, and the pitch acceleration $\Theta_g''$ at the sprung gravity center position GC. However, the manner of calculating the vertical acceleration $Z_g''$, the roll acceleration $\Phi_g''$, and the pitch acceleration $\Theta_g''$ at the sprung gravity center position GC is not limited to the above manner. For example, only three sprung acceleration sensors 14 may be used.

The ECU 10 then integrates the mode accelerations (i.e., the vertical acceleration $Z_g''$, the roll acceleration $\Phi_g''$, and the pitch acceleration $\Theta_g''$) to calculate respective mode velocities (i.e., vertical velocity $Z_g'$, roll velocity $\Phi_g'$, and pitch velocity $\Theta_g'$) at the sprung gravity center position GC. The vertical velocity $Z_g'$, the roll velocity $\Phi_g'$, and the pitch velocity $\Theta_g'$ at the sprung gravity center position GC are expressed by the following Equations (5) to (7), respectively.

$$Z_g' = \int Z_g'' \quad (5)$$

$$\Phi_g' = \int \Phi_g'' \quad (6)$$

$$\Theta_g' = \int \Theta_g'' \quad (7)$$

Similarly, the ECU 10 integrates the mode velocities (i.e., the vertical velocity $Z_g'$, the roll velocity $\Phi_g'$, and the pitch velocity $\Theta_g'$) to calculate respective mode displacements (i.e., vertical displacement $Z_g$, roll angle (roll angle displacement) $\Phi_g$, and pitch angle (pitch angle displacement) $\Theta_g$) at the sprung gravity center position GC. The vertical displacement $Z_g$, the roll angle $\Phi_g$, and the pitch angle $\Theta_g$ at the sprung gravity center position GC are expressed by the following Equations (8) to (10), respectively.

$$Z_g = \int Z_g' \quad (8)$$

$$\Phi_g = \int \Phi_g' \quad (9)$$

$$\Theta_g = \int \Theta_g' \quad (10)$$

The ECU 10 then calculates a required vertical control amount Fz, a required roll control amount Mr, and a required pitch control amount Mp for reducing respective mode vibrations (i.e., vertical vibration, roll vibration, and pitch vibration) at the sprung gravity center position GC. Here, it is assumed that the required vertical control amount Fz is positive when an upward control force is required. It is assumed that the required roll control amount Mr is positive when a control moment acting to lower the right side of the vehicle 1 and raise the left side thereof is required. It is assumed that the required pitch control amount Mp is positive when a control moment acting to lower the front side of the vehicle 1 and raise the rear side thereof is required.

The ECU 10 calculates these required vertical control amount Fz, the required roll control amount Mr, and the required pitch control amount Mp by using the mode accelerations (the vertical acceleration $Z_g''$, the roll acceleration $\Phi_g''$, and the pitch acceleration $\Theta_g''$), the mode velocities (the vertical velocity $Z_g'$, the roll velocity $\Phi_g'$, and the pitch velocity $\Theta_g'$), and the mode displacements (the vertical displacement $Z_g$, the roll angle $\Phi_g$, and the pitch angle $\Theta_g$) acquired as described above. For example, the required vertical control amount Fz, the required roll control amount Mr, and the required pitch control amount Mp are respectively given by the following Equations (11) to (13).

$$F_z = G1_z \cdot Z_g + G2_z \cdot Z_g' + G3_z \cdot Z_g'' \quad (11)$$

$$M_r = G1_r \cdot \Phi_g + G2_r \cdot \Phi_g' + G3_r \cdot \Phi_g'' \quad (12)$$

$$M_p = G1_p \cdot \Theta_g + G2_p \cdot \Theta_g' + G3_p \cdot \Theta_g'' \quad (13)$$

In Equations (11) to (13), $G1z$, $G2z$, $G3z$, $G1r$, $G2r$, $G3r$, $G1p$, $G2p$, and $G3p$ are control gains. In the following description, each control gain is referred to as a control gain G unless it is particularly necessary to distinguish from each other. In the present embodiment, each control gain G is determined by a "gain determination process" described below.

As expressed by Equations (11) to (13), each of the required vertical control amount Fz, the required roll control amount Mr, and the required pitch control amount Mp has a displacement term, a velocity term, and an acceleration term related to the displacement, velocity, and acceleration of the sprung structure 5.

More specifically, the required vertical control amount Fz has a displacement term which is a product of the vertical displacement Zg and the control gain G1z, a velocity term which is a product of the vertical velocity Zg' and the control gain G2z, and an accelerating term which is a product of the vertical acceleration Zg" and the control gain G3z.

Similarly, the required roll control amount Mr has a displacement term which is a product of the roll angle Φg and the control gain G1r, a velocity term which is a product of the roll velocity Φg' and the control gain G2r, and an acceleration term which is a product of the roll acceleration Φg" and the control gain G3r.

Similarly, the required pitch control amount Mp has a displacement term which is a product of the pitch angle Θg and the control gain G1p, a velocity term which is a product of the pitch velocity Θg' and the control gain G2p, and an acceleration term which is a product of the pitch acceleration Θg" and the control gain G3p.

The ECU 10 then converts the required control amounts Fz, Mr, and Mp at the sprung gravity center position GC into required control amounts at the positions of the wheels 2 (2FR, 2FL, 2RR, and 2RL). These required control amounts at the positions of the wheels 2 correspond to target control forces Fct of the actuators 3A for the wheels 2.

The tread width of the front wheels 2F is Tf, and the tread width of the rear wheels 2R is Tr. A distance between the front wheel shaft and the sprung gravity center position GC is lf, and a distance between the rear wheel shaft and the sprung gravity center position GC is lr. In this example, the target control forces Fct for the respective actuators 3A (i.e., target control forces Fctfr, Fctfl, Fctrr, and Fctrl) are expressed by the following Equation (14).

$$\begin{bmatrix} Fct_{fr} \\ Fct_{fl} \\ Fct_{rr} \\ Fct_{rl} \end{bmatrix} = \begin{bmatrix} \frac{l_r}{2(l_f+l_r)} & -\frac{1}{2T_f} & -\frac{1}{4l_f} \\ \frac{l_r}{2(l_f+l_r)} & \frac{1}{2T_f} & -\frac{1}{4l_f} \\ \frac{l_f}{2(l_f+l_r)} & -\frac{1}{2T_r} & \frac{1}{4l_r} \\ \frac{l_f}{2(l_f+l_r)} & \frac{1}{2T_r} & \frac{1}{4l_r} \end{bmatrix} \begin{bmatrix} F_z \\ M_r \\ M_p \end{bmatrix} \quad (14)$$

The ECU 10 can convert the required control amounts Fz, Mr, and Mp at the sprung gravity center position GC into the target control forces Fct for the respective actuators 3A in accordance with this Equation (14). Alternatively, the ECU 10 may calculate the target control force Fct for each wheel 2, from a map based on the required control amounts Fz, Mr, and Mp.

2-2. Issues and Measures of FB Control of Sprung State Quantities

Vibration of the sprung structure 5 of the vehicle 1 is generated when each wheel 2 receives road surface input. Here, for convenience of explanation, "information related to the road surface input" and "information related to the vibration of the sprung structure 5 caused by the road surface input" are collectively referred to as "road surface vibration information".

Specifically, the former "information related to the road surface input" is, for example, information indicating the magnitude of the road surface input or the magnitude of the road surface input velocity. The road surface input corresponds to, for example, a road surface displacement Zr which is a displacement of the road surface in the vertical direction, or an unsprung displacement Zu which is a displacement of the unsprung structure 4 in the vertical direction at the position of each wheel 2. The road surface input velocity corresponds to, for example, a road surface displacement velocity Zr' which is a time differential value of the road surface displacement Zr, or an unsprung velocity Zu'. In addition, the information related to the road surface input may include, for example, a road surface displacement acceleration Zr" which is a time differential value of the road surface displacement velocity Zr', or an unsprung acceleration Zu".

The latter "information related to the vibration of the sprung structure 5 caused by the road surface input" corresponds to, for example, various sprung state quantities. Specifically, the information corresponds to, for example, a sprung state quantity at the position of each wheel 2 (i.e., sprung displacement Zs, sprung velocity Zs', or sprung acceleration Zs"), or a sprung state quantity at the sprung gravity center position GC (i.e., the vertical displacement Zg, the vertical velocity Zg', or the vertical acceleration Zg").

It should be noted that the signs of the road surface displacement Zr, the unsprung displacement Zu, the sprung displacement Zs, and the vertical displacement Zg are positive when they are directed upward, and are negative when they are directed downward.

The frequency characteristics of the road surface vibration information as described above may differ depending on the road surface on which the vehicle 1 travels. On the other hand, if the required control amount X has at least two control terms among the displacement term, the velocity term, and the acceleration term as in the example shown in Equations (11) to (13) described above, a frequency band having a high vibration damping effect of reducing the vibration of the sprung structure 5 basically differs depending on the control term. Similarly, a frequency band having a vibration excitation effect of promoting the vibration of the sprung structure 5 also basically differs depending on the control term. Therefore, if the control gain G of each control term is determined by a balance based on, for example, vehicle specifications without considering that the frequency characteristics of the road surface vibration information differs depending on the road surface on which the vehicle 1 travels, a situation may occur in which the vibration damping effect by the present FB control cannot be sufficiently improved.

In view of the above-described issue, the processing executed by the ECU 10 for the FB control in the present embodiment include the following "calculation process" and "gain determination process". Specific examples of these processes are described with reference to a flowchart shown in FIG. 3, and the outline of these processes is as follows.

The calculation process is a process of calculating the magnitude (amplitude) of a frequency component of each of a plurality of frequency bands B included in the above-described road surface vibration information. The gain determination process is a process of determining the control gain G of each of the three control terms (i.e., the displacement term, the velocity term, and the acceleration term) so as to change based on the magnitude of the frequency component of each of the plurality of frequency bands B.

More specifically, according to the present embodiment, the gain determination process is executed as follows. Here, for convenience of explanation, a frequency band having the largest frequency component among the plurality of frequency bands B is referred to as a "specific frequency band Bx". The gain determination process is executed so as to increase one or more control gains G of one or more control terms having the vibration damping effect in the specific frequency band Bx among the three control terms (i.e., the displacement term, the velocity term, and the acceleration term), and decrease one or more control gains G of one or more control terms having the vibration excitation effect in the specific frequency band Bx among the three control terms.

Figure 3:
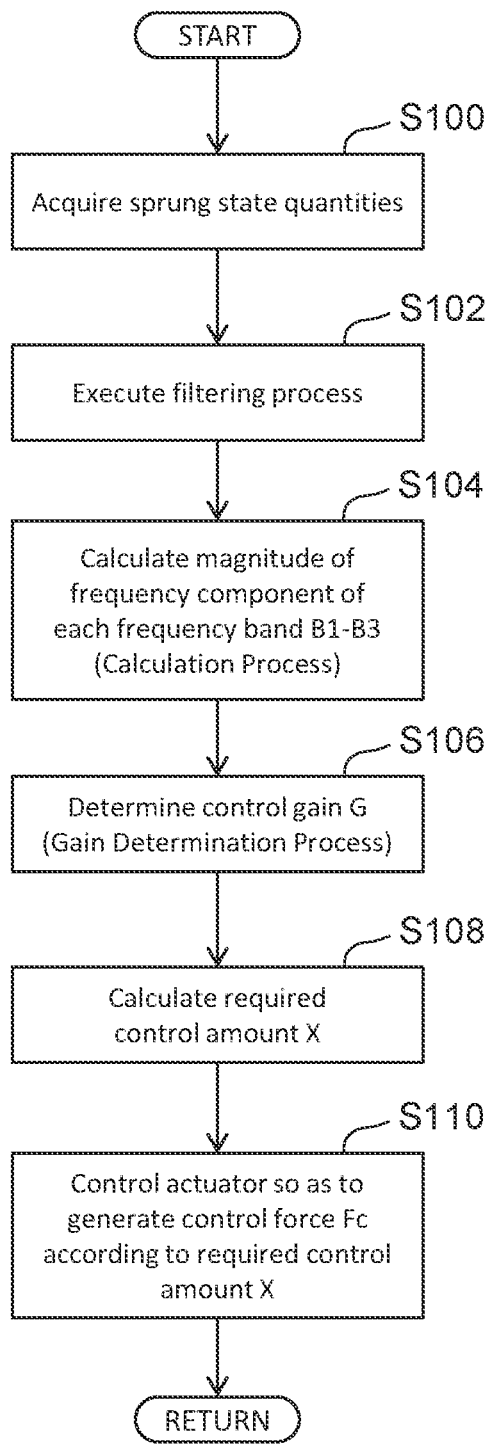
FIG. 3 is a flowchart showing processing related to FB control of sprung state quantities according to the embodiment.

FIG. 3 is a flowchart showing processing related to the FB control of the sprung state quantities according to the embodiment. The processing of this flowchart is repeatedly executed for each designated time step during traveling of the vehicle 1. It should be noted that, in FIG. 3, the process of step S104 corresponds to an example of the "calculation process" described above, and the process of step S106 corresponds to an example of the "gain determination process" described above.

<Step S100>

In step S100, the ECU 10 acquires the "sprung state quantities" used to calculate a required control amount X for reducing the vibration of the sprung structure 5. It should be noted that each control term of the required control amount X is represented by the product of the sprung state quantity and the respective control gain G. For this reason, when this control gain G increases, the value (i.e., the control amount) of the control term having the control gain G increases, in other words, the control force Fc increases. As a result, the control effect (i.e., the vibration damping effect or the vibration excitation effect) increases.

As described above, in the present embodiment, as an example of the required control amount X, the required vertical control amount (i.e., required heave control amount) Fz, the required roll control amount Mr, and the required pitch control amount Mp are used (see Equations (11) to (13)). Therefore, in step S100, the ECU 10 acquires each of the mode accelerations (i.e., the vertical acceleration $Zg''$, the roll acceleration $\Phi g''$, and the pitch acceleration $\Theta g''$), each of the mode velocities (i.e., the vertical velocity $Zg'$, the roll velocity $\Phi g'$, and the pitch velocity $\Theta g'$), and each of the mode displacements (i.e., the vertical displacement Zg, the roll angle $\Phi g$, and the pitch angle $\Theta g$), which are the sprung state quantities used to calculate the required control amounts Fz, Mr, and Mp.

Additionally, the required control amount X in the FB control of the sprung state quantities may be acquired so as to have at least two control terms of a displacement term, a velocity term, and an acceleration term that are each represented by the product of the sprung state quantities (i.e., displacement, velocity, and acceleration) and the control gains G. Therefore, instead of the required control amounts Fz, Mr, and Mp for reducing the each of the mode vibrations of the sprung gravity center position GC, the required control amount X may be, for example, a product of sprung state quantities at the position of each wheel 2 (the sprung displacement Zs, the sprung speed $Zs'$, and the sprung acceleration $Zs''$) and the respective control gains. Moreover, the sprung state quantities used to calculate the required control amount X may be an in-phase component or a reverse-phase component of the sprung state quantities at the position of the left and right front wheels 2F or the left and right rear wheels 2R. Furthermore, the acquisition of the sprung state quantities is not limited to that based on one ore more measurement values by one or more sensors, and may be, for example, performed by using estimation by an observer or a model.

<Step S102>

Next, in step S102, the ECU 10 executes a filtering process. This filtering process includes application of a high-pass filter (HPF) to the sprung state quantities ($Zg''$, $\Phi g''$, $\Theta g''$, $Zg'$, $\Phi g'$, $\Theta g'$, Zg, $\Phi g$, and $\Theta g$) of the respective control terms (displacement term, velocity term, and acceleration term) included in each of Equations (11) to (13), and application of a low-pass filter (LPF) to the sprung state quantities.

The HPF described above is applied in order to remove an integral offset that occurs when each mode velocity and each mode displacement are calculated from each mode acceleration acquired using the detection values of the sprung acceleration sensors 14-$i$ ($i$=1 to 4). In step S102, the strength of this HPF is made different between the control terms. Specifically, the strength of the HPF applied to each of the sprung state quantities included in the respective displacement terms (i.e., each of the individual mode displacements) is increased as compared with the strength of the HPF applied to each of the sprung state quantities included in the velocity terms and the acceleration terms which are the remaining control terms (i.e., each of the mode velocities and each of the mode accelerations). The strength of the HPF can be increased by, for example, at least one of increasing the number of times the HPF is applied and increasing the order of the HPF.

The LPF described above is applied in order to express (simulate) the response delay of the FB control. In this step S102, the strength of this LPF is made different between the control terms. Specifically, the strength of the LPF applied to each of the sprung state quantities included in the acceleration terms (i.e., each of the mode accelerations) is increased as compared with the strength of the LPF applied to each of the sprung state quantities included in the displacement terms and the velocity terms which are the remaining control terms (i.e., each of the mode displacements and each of the mode velocities). The strength of the LPF can be increased by, for example, at least one of increasing the number of times the LPF is applied and increasing the order of the LPF.

It should be noted that, unlike the example described above, only one of the HPL and the LPF may be applied to the sprung state quantities of the respective control terms. In addition, when at least one of the HPL and the LPF is applied to the sprung state quantities of the respective control terms, unlike the process of step S102, the strength of at least one of the HPF and the LPF applied to the sprung state quantities of the respective control terms may be the same between the control terms.

<Step S104>

Next, in step S104, the ECU 10 executes the "calculation process" in order to calculate the magnitude of the frequency component of each of the plurality of frequencies B included in the road surface vibration information described above. This calculation process is executed in order to acquire the magnitude of the frequency component for evaluating the frequency characteristic of the road surface that gives input to the vehicle 1 which is traveling. More specifically, the calculated magnitude of the frequency component of each frequency band B is used to evaluate a difference in magnitude of the frequency component between the plurality of frequency bands B to be determined (for example, to evaluate whether the road surface is a road surface having many high-frequency components or a road surface having many low-frequency components).

Figure 4:
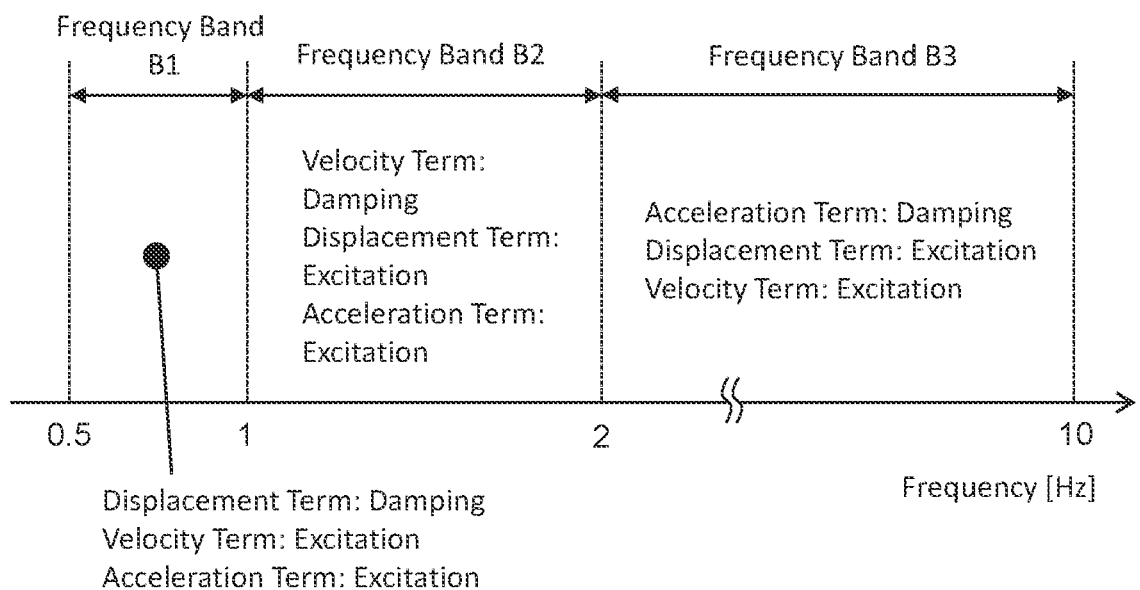
FIG. 4 is a diagram showing an example of a plurality of frequency bands B for which the magnitudes of frequency components are acquired in step S104 shown in FIG. 3.

Specifically, the "plurality of frequency bands B" mentioned here are determined as follows, for example. FIG. 4 is a diagram showing an example of the plurality of frequency bands B for which the magnitudes of the frequency components are acquired in step S104. FIG. 4 illustrates three frequency bands B1, B2, and B3, for example.

A frequency band B1 is a frequency band from 0.5 to 1 Hz, a frequency band B2 is a frequency band from 1 to 2 Hz, and a frequency band B3 is a frequency band from 2 to 10 Hz. In the example shown in FIG. 4, the frequency band B1 is a frequency band in which the displacement term has the vibration damping effect and the remaining velocity and acceleration terms each have the vibration excitation effect. The frequency band B2 is a frequency band in which the velocity term has the vibration damping effect and the remaining displacement and acceleration terms each have the vibration excitation effect. The frequency band B3 is a frequency band in which the acceleration term has the vibration damping effect, and the remaining displacement term and velocity term each have the vibration excitation effect.

By determining the plurality of frequency bands B as illustrated in FIG. 4 in advance in consideration of the characteristics of the vehicle 1, it is possible to grasp the specific frequency band Bx which is a frequency band having the largest frequency component among the plurality of frequency bands B included in the road surface vibration information acquired during traveling of the vehicle 1.

Then, the processing of step S104 is described in detail with reference to an example in which the above-described three frequency bands B1 to B3 are used. Here, the unsprung velocity Zu' is used as an example of the road surface vibration information. The unsprung velocity Zu' used is, for example, an unsprung velocity Zu' of any one of the four wheels 2. However, in an example in which the required control amount X itself is calculated for each wheel 2, the unsprung velocity Zu' as an example of the road surface vibration information may be acquired for each wheel 2. For example, the unsprung velocity Zu' is acquired by integrating the unsprung acceleration Zu" detected by the unsprung acceleration sensor. For example, the unsprung velocity Zu' is acquired for each time step and stored in the memory device of the ECU 10 as a time-series data of the unsprung velocity Zu'. It should be noted that, when preview damping control based on road surface information in front of the vehicle 1 is performed as one of the suspension controls of the vehicle 1, the road surface information (for example, the unsprung velocity Zu') acquired for the preview damping control during traveling of the vehicle 1 by using a camera or acquired in advance may be used in this step S104.

In this step S104, the ECU 10 applies three band-pass filters (BPFs) having the above-described three frequency bands B1 to B3, as the respective passing frequency bands, to the time-series data of the unsprung velocity Zu' acquired as described above. Then, the ECU 10 uses the data of the unsprung velocity Zu' to which each of the three BPFs having different passing frequency bands has been applied in this manner to calculate the magnitude (for example, signal strength) of each of the frequency components of the respective frequency bands B1 to B3. More specifically, for example, a moving average value or a peak hold value of the data of the unsprung velocity Zu' to which the each of BPFs has been applied is calculated as the magnitude of each frequency component.

Additionally, unlike the present embodiment, in an example in which the required control amount X includes only two control terms among the displacement term, the velocity term, and the acceleration term, the "plurality of frequency bands B" may be two.

Furthermore, in the example of the frequencies B1 to B3 shown in FIG. 4, when attention is focused on, for example, the displacement term, the frequency bands B2 and B3 correspond to frequency bands having the vibration excitation effect for the displacement term. That is, in this example, the frequency bands in which the displacement term has the vibration excitation effect are the same frequency bands B2 and B3 as the frequency bands having the vibration damping effect for the other control terms as shown in FIG. 4. However, this kind of relationship is not always satisfied, and depending on the characteristics of the vehicle to which the FB control is applied, a frequency band in which the displacement term has the vibration excitation effect may be different from a frequency band in which another control term has the vibration damping effect. This also applies to each of the other velocity term and acceleration term. Accordingly, as described here, when a frequency band in which a control term has the vibration excitation effect is different from a frequency band in which another control term has the vibration damping effect, the "plurality of frequency bands B" may separately include a frequency band having the vibration damping effect and a frequency band having the vibration excitation effect for each control term.

<Step S106>

Next, in step S106, the ECU 10 executes the gain determination process. Specifically, in step S106, first, the ECU 10 determines the specific frequency band Bx based on the calculation results of each frequency component in step S104. As a result, the frequency characteristic of the road surface on which the vehicle 1 is currently traveling is grasped.

Then, the ECU 10 determines the control gain G of each control term according to which one of the frequency bands B1 to B3 the specific frequency band Bx is. Hereinafter, the control gains $G1z$, $G1r$, and $G1p$ of the displacement terms are also collectively referred to as "control gain G1". Similarly, the control gains $G2z$, $G2r$, and $G2p$ of the velocity terms are also collectively referred to as "control gain G2", and the control gains $G3z$, $G3r$, and $G3p$ of the acceleration terms are also collectively referred to as "control gain G3".

The ECU 10 has basic values $G1b$, $G2b$, and $G3b$ for the control gains G1, G2, and G3, respectively. These basic values $G1b$, $G2b$, and $G3b$ are determined in advance so as to acquire a balance between the control terms in which the present FB control can exert an appropriate vibration damping effect under the frequency characteristic of a designated standard road surface.

Figure 5:
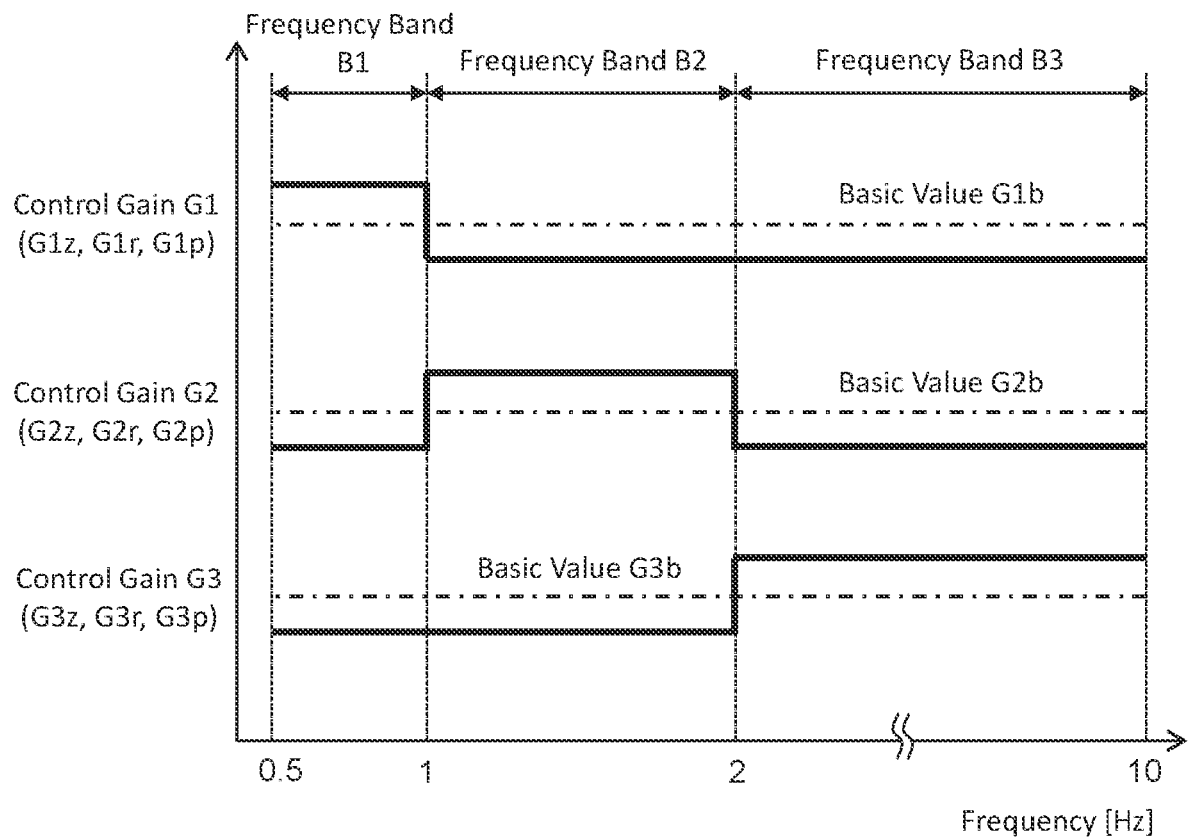
FIG. 5 is a diagram illustrating an example of setting of control gains G1 to G3 based on a specific frequency band Bx.

FIG. 5 is a diagram illustrating an example of setting of the control gains G1 to G3 based on the specific frequency band Bx. As shown in FIG. 5, the control gain G1 of the displacement term is determined to be larger than the basic value $G1b$ (one-dot-dashed line) when the frequency band B1 is the specific frequency band Bx, and to be smaller than the basic value $G1b$ when the frequency band B2 or B3 is the specific frequency band Bx. The control gain G2 of the velocity term is determined to be larger than the basic value $G2b$ (one-dot-dashed line) when the frequency band B2 is the specific frequency band Bx, and to be smaller than the basic value $G2b$ when the frequency band B1 or B3 is the specific frequency band Bx. The control gain G3 of the acceleration term is determined to be larger than the basic value G3b (one-dot-dashed line) when the frequency band B3 is the specific frequency band Bx, and to be smaller than the basic value G3b when the frequency band B1 or B2 is the specific frequency band Bx. It should be noted that the amount of increase/decrease in each of the control gains G1, G2, and G3 with respect to the basic values G1b, G2b, and G3b is determined, for example, in consideration of the characteristics of the vehicle 1 to which the present FB control is applied.

The relationship as shown in FIG. 5 is stored as a map in the memory device of the ECU 10. The ECU 10 acquires the control gains G1 to G3 according to the acquired specific frequency band Bx from this kind of map.

By this kind of processing, the control gains G1, G2, and G3 are increased or decreased from the basic values G1b, G2b, and G3b determined as described above, in response to the frequency characteristics of the road surface on which the vehicle 1 is currently traveling.

Additionally, in the example shown in FIG. 4, the "plurality of frequency bands B" include, for each control term, the frequency bands B1, B2, and B3 in which the displacement term, the velocity term, and the acceleration term each have the vibration damping effect. Here, when the required control amount X has the displacement term, the velocity term, and the acceleration term, the frequency bands in which the individual control terms have the vibration damping effect are not always clearly separated as in the example of the frequency bands B1 to B3, depending on the characteristics of the vehicle to which the present FB control is applied. Specifically, for example, a part of the frequency band having the vibration damping effect may overlap between any two control terms. Accordingly, when there are two control terms having the vibration damping effect in a frequency band B corresponding to the specific frequency band Bx, the control gains G of the two control terms may be increased from their respective basic values.

(Modification Example)

Figure 6:
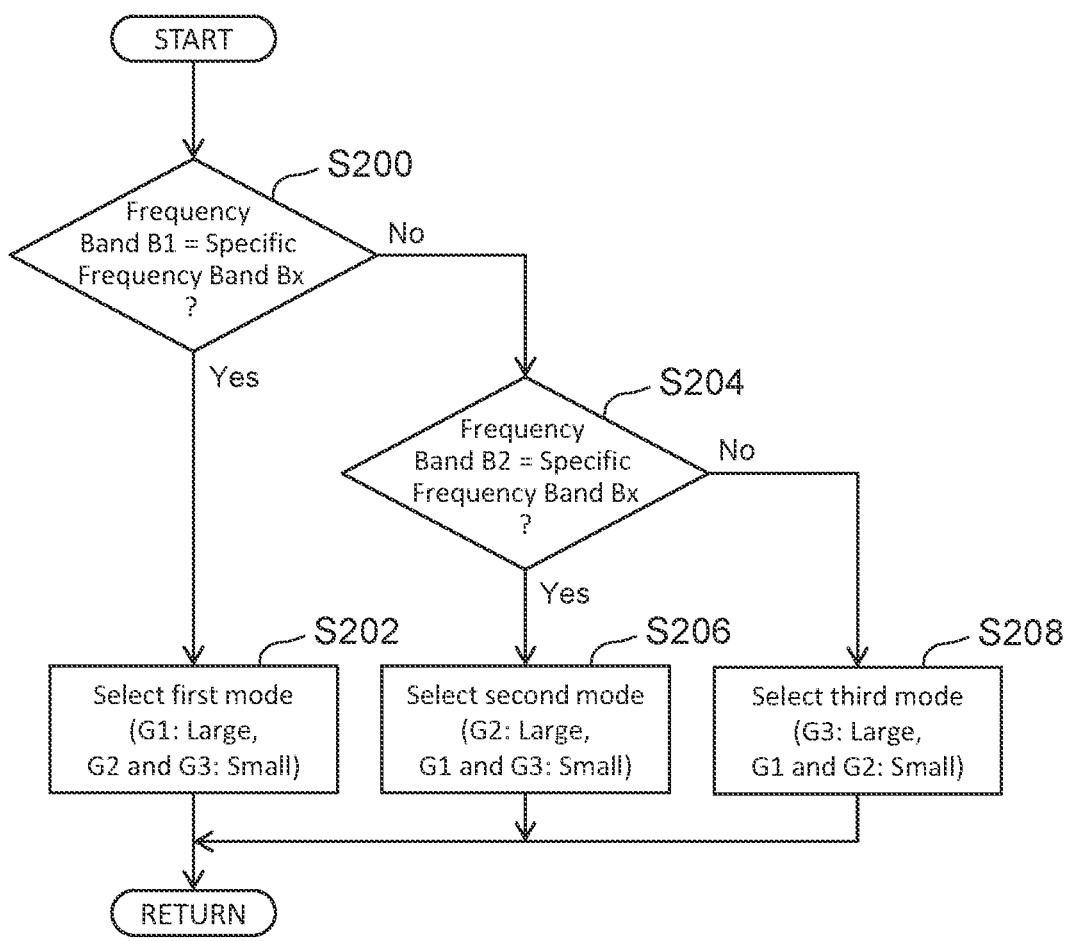
FIG. 6 is a flowchart showing a modification example of a gain determination process according to the embodiment.

The "gain determination process" according to the present disclosure may be executed as follows, for example, instead of the example using the map that defines the relationship as shown in FIG. 5. FIG. 6 is a flowchart showing a modification example of the gain determination process according to the embodiment. In this modification example, the first to third modes in which the balance of the control gains G between the control terms is different from each other are switched depending on which of the frequency bands B1 to B3 the specific frequency band Bx is.

Specifically, in FIG. 6, the ECU 10 determines in step 200 whether or not the frequency band B1 is the specific frequency band Bx. When this determination result is Yes, the ECU 10 selects the first mode in step S202. The first mode is a mode that uses the control gain G1 (displacement term) larger than the basic value G1b, the control gain G2 (velocity term) smaller than the basic value G2b, and the control gain G3 (acceleration term) smaller than the basic value G3b.

When, on the other hand, the determination result in step S200 is No, in step S204, the ECU 10 determines whether or not the frequency band B2 is the specific frequency band Bx. When this determination result is Yes, the ECU 10 selects the second mode in step S206. The second mode is a mode that uses the control gain G1 smaller than the basic value G1b, the control gain G2 larger than the basic value G2b, and the control gain G3 smaller than the basic value G3b.

When the determination result in step S204 is No (that is, when the frequency band B3 is the specific frequency band Bx), the ECU 10 selects the third mode in step S208. The third mode is a mode that uses the control gain G1 smaller than the basic value G1b, the control gain G2 smaller than the basic value G2b, and the control gain G3 larger than the basic value G3b.

<Step S108>

Next, in step S108, the ECU 10 calculates the required vertical control amount Fz, the required roll control amount Mr, and the required pitch control amount Mp, which each correspond to the required control amount X. Specifically, in the example of the processing shown in FIG. 3 associated with the filtering process of step S102, the values after the application of the HPF and the LPF described above are used as the sprung state quantities (Zg", Φg", Θg", Zg', Φg', Θg', Zg, Φg, and Θg) substituted into Equations (11) to (13). That is, the ECU 10 calculates each of the required control amounts Fz, Mr, and Mp based on the products of the sprung state quantities after the application of the HPF and the LPF and the respective control gains G determined in step S106.

<Step S110>

Next, in step S110, the ECU 10 controls each actuator 3A so as to generate the control force Fc according to the required control amount X calculated in step S108. Specifically, in accordance with Equation (14), the ECU 10 calculates target control forces Fct (Fctfr, Fctfl, Fctrr, and Fctrl) of the wheels 2 according to the required control amounts X (Fz, Mr, and Mp) calculated in step S108. Then, the ECU 10 commands the calculated target control forces Fct to the actuators 3A associated with the respective wheels 2.

3. Effect

As described above, according to the present embodiment, when the required control amount X is calculated, the frequency component of each of the plurality of frequency bands B included in the road surface vibration information are calculated. Then, the control gain G of each of the three control terms (i.e., the displacement term, the velocity term, and the acceleration term) is determined so as to change based on the calculated magnitude of the frequency component of each frequency band B. More specifically, the specific frequency band Bx which is a frequency band having the largest frequency component among the plurality of frequency bands B is determined. Then, among the three control terms (i.e., the displacement term, the velocity term, and the acceleration term), the control gain G of the control term having the vibration damping effect in the specific frequency band Bx is increased, and the control gains G of the control terms having the vibration excitation effect in the specific frequency band Bx is decreased (gain determination process). In this way, the control gain G of each control term is not determined by a balance according to the skyhook control law, but is determined so as to obtain an appropriate balance for exerting a high vibration damping effect with respect to the frequency characteristics of the road surface on which the vehicle 1 is currently traveling. Accordingly, it is possible to effectively perform vibration damping of the sprung structure 5 in accordance with the road surface vibration information. More specifically, it is possible to suitably reduce a decrease in the vibration damping effect due to the frequency characteristics of the road surface.

Additionally, according to the gain determination process described above, the balance of the control gains G of the respective control terms is determined such that the frequency component of a frequency band B corresponding to the specific frequency band Bx having the largest frequency component can be effectively reduced as compared with the frequency components of the other frequency bands. Here, according to the definition of the specific frequency band Bx described above, the magnitude of each of the frequency components of the other frequency bands is smaller than the magnitude of the frequency component of the specific frequency band Bx. Therefore, although there is a possibility that the frequency components of the other frequency bands may become large as a trade-off of determining the balance of the control gains G in this manner, the influence of the trade-off is small. That is, by using the gain determination process, it is possible to improve the vibration damping of the sprung structure 5 even when the plurality of frequency bands B are viewed as a whole.

Moreover, according to the above-described filtering process (see step S102), each of the HPF and the LPF applied to the sprung state quantities used for the calculation of the required control amount X are not the same between the control terms, but are different between the control terms.

To be more specific, as exemplified as the frequency band B1 (see FIG. 4), the vibration damping effect by the displacement term is obtained on the low frequency side, but the value of the displacement term (i.e., the control amount) is inherently likely to be excessively large. In view of this kind of additional issue A, according to the present embodiment, the strength of the HPF applied to the sprung state quantities (i.e., each mode displacement) included in the displacement term is increased as compared with the strength of the HPF applied to each of the sprung state quantities (i.e., each mode velocity and each mode acceleration) included in the velocity term and the acceleration term which are the remaining control terms. As a result, it is possible to adjust the balance between the control terms so as to prevent the value of the displacement term from becoming excessive. In addition, in view of the additional issue A described above, the basic value of the control gain G of the displacement term may be determined so as to be small by using, as a reference, the balance of the basic values of the control gains G between the control terms according to the skyhook control law.

Furthermore, as exemplified as the frequency band B3 (see FIG. 4), the vibration damping effect by the acceleration term is obtained on the medium to high frequency side, but the acceleration term may cause deterioration of vibration or instability of control on the higher frequency side than the frequency band in which the vibration damping effect is obtained. In view of this kind of additional issue B, according to the present embodiment, the strength of the LPF applied to the sprung state quantities (each mode acceleration) included in the acceleration term is increased as compared with the strength of the LPF applied to each of the sprung state quantities (i.e., each mode displacement and each mode velocity) included in the displacement term and the velocity term which are the remaining control terms. As a result, it is possible to adjust the balance between the control terms so as to reduce the deterioration of vibration or the instability of control on the higher frequency side than the frequency band in which the vibration damping effect is obtained by the acceleration term. In addition, in view of the additional issue B described above, the basic value of the control gain G of the acceleration term may be determined so as to be small by using, as a reference, the balance of the basic values of the control gains G between the control terms according to the skyhook control law.

In the embodiment described above, the "gain determination process" is executed so as to increase the control gain G of the control term having the vibration damping effect in the specific frequency band Bx among the three control terms (i.e., the displacement term, the velocity term, and the acceleration term), and decrease the control gains G of the control terms having the vibration excitation effect in the specific frequency band Bx. However, the "gain determination process" according to the present disclosure is not limited to a process of changing the control gain G of each control term focusing on only the specific frequency band Bx as described above, and may be a process of "determining the control gain of each of at least two control terms so as to change based on the magnitude of the frequency component of each of a plurality of frequency bands".

Specifically, when, for example, the three frequency bands B1 to B3 described above are used, the gain determination process may change the control gain G of each control term by, for example, focusing not only on the specific frequency band Bx but also on a frequency band having the second largest frequency component among the three frequency bands B1 to B3 (hereinafter, referred to as a "second frequency band Bx2"). Then, the amount of increase in the control gain G of a control term having the vibration damping effect in the second frequency band Bx2 may be, for example, set to be smaller than the amount of increase in the control gain G of a control term having the vibration damping effect in the specific frequency band Bx. Similarly, the amount of decrease in the control gain G of a control term having the vibration excitation effect in the second frequency band Bx2 may be, for example, set to be smaller than the amount of decrease in the control gain G of a control term having the vibration excitation effect in the specific frequency band Bx.

Furthermore, the gain determination process may be executed as follows, for example. That is, when, for example, the above-described three frequency bands B1 to B3 are used, the gain determination process may change the control gain G of each control term by focusing not only on the specific frequency band Bx and the second frequency band Bx2 but also on a frequency band having the smallest frequency component among the three frequency bands B1 to B3 (hereinafter, referred to as a "third frequency band Bx3"). Then, the amount of increase in the control gain G of a control term having the vibration damping effect in the third frequency band Bx3 may be, for example, set to be smaller than the amount of increase in the control gain G of a control term having the vibration damping effect in the second frequency band Bx2. Similarly, the amount of decrease in the control gain G of a control term having the vibration excitation effect in the third frequency band Bx3 may be, for example, set to be smaller than the amount of decrease in the control gain G of a control term having the vibration excitation effect in the second frequency band Bx2.

What is claimed is:

1. A vehicle suspension control device, comprising:
   an actuator configured to apply a control force in a vertical direction between an unsprung structure and a sprung structure of a vehicle; and
   an electronic control unit configured to control the actuator so as to generate the control force according to a required control amount for reducing vibration of the sprung structure, wherein
   the required control amount includes at least two control terms of a displacement term, a velocity term, and an acceleration term related to displacement, velocity, and acceleration of the sprung structure,
   the electronic control unit is configured to execute:
   a calculation process of calculating a magnitude of a frequency component of each of a plurality of frequency bands included in road surface vibration information related to road surface input to the vehicle or the vibration of the sprung structure due to the road surface input, and a gain determination process of determining a control gain of each of the at least two control terms so as to change based on the magnitude of the frequency component of each of the plurality of frequency bands.

2. The vehicle suspension control device according to claim 1, wherein a frequency band having a largest frequency component among the plurality of frequency bands is referred to as a specific frequency band, and in the gain determination process, the electronic control unit is configured to:

increase one or more control gains of one or more control terms having a vibration damping effect of reducing the vibration of the sprung structure in the specific frequency band among the at least two control terms; and decrease one or more control gains of one or more control terms having a vibration excitation effect of promoting the vibration of the sprung structure in the specific frequency band among the at least two control terms.

3. The vehicle suspension control device according to claim 1, wherein the at least two control terms include the displacement term, and strength of a high-pass filter applied to a sprung state quantity included in the displacement term is higher than strength of a high-pass filter applied to one or more sprung state quantities included in a remaining one or two control terms.

4. The vehicle suspension control device according to claim 1, wherein the at least two control terms include the acceleration term, and strength of a low-pass filter applied to a sprung state quantity included in the acceleration term is higher than strength of a low-pass filter applied to one or more sprung state quantities included in a remaining one or two control terms.

5. The vehicle suspension control device according to claim 1, wherein the plurality of frequency bands include, for each of the at least two control terms, a frequency band having a vibration damping effect of the sprung structure.

6. The vehicle suspension control device according to claim 1, wherein the plurality of frequency bands include, for each of the at least two control terms, a frequency band having a vibration excitation effect of the sprung structure.

7. A vehicle suspension control method of controlling an actuator, which is configured to apply a control force in a vertical direction between an unsprung structure and a sprung structure of a vehicle, so as to generate the control force according to a required control amount for reducing vibration of the sprung structure, wherein the required control amount includes at least two control terms of a displacement term, a velocity term, and an acceleration term related to displacement, velocity, and acceleration of the sprung structure, the vehicle suspension control method comprising:

calculating a magnitude of a frequency component of each of a plurality of frequency bands included in road surface vibration information related to road surface input to the vehicle or the vibration of the sprung structure due to the road surface input; and determining a control gain of each of the at least two control terms so as to change based on the magnitude of the frequency component of each of the plurality of frequency bands.

* * * * *